(12) United States Patent
Gilbertson et al.

(10) Patent No.: US 11,447,229 B2
(45) Date of Patent: Sep. 20, 2022

(54) TRANSPORT ELEMENT SUPPORT SYSTEM

(71) Applicant: The Boeing Company, Chicago, IL (US)

(72) Inventors: Michael Leslie Gilbertson, Arlington, WA (US); Mark L. Carpenter, Mukilteo, WA (US)

(73) Assignee: The Boeing Company, Chicago, IL (US)

(*) Notice: Subject to any disclaimer, the term of this patent is extended or adjusted under 35 U.S.C. 154(b) by 1217 days.

(21) Appl. No.: 15/933,784

(22) Filed: Mar. 23, 2018

(65) Prior Publication Data
US 2019/0291842 A1 Sep. 26, 2019

(51) Int. Cl.
| | | |
|---|---|---|
| B64C 1/40 | (2006.01) | |
| F16L 3/015 | (2006.01) | |
| H02G 3/00 | (2006.01) | |
| F17C 5/06 | (2006.01) | |
| F16L 3/10 | (2006.01) | |
| H02G 3/22 | (2006.01) | |
| H02G 3/36 | (2006.01) | |

(52) U.S. Cl.
CPC .............. *B64C 1/406* (2013.01); *F16L 3/015* (2013.01); *F16L 3/1083* (2013.01); *F17C 5/06* (2013.01); *H02G 3/22* (2013.01); *H02G 3/26* (2013.01); *H02G 3/263* (2013.01); *H02G 3/36* (2013.01)

(58) Field of Classification Search
CPC ........ B64C 1/406; F16L 3/015; F16L 3/1083; F17C 5/06; H02G 3/22; H02G 3/26; H02G 3/263; H02G 3/36
See application file for complete search history.

(56) References Cited

U.S. PATENT DOCUMENTS

| | | | | |
|---|---|---|---|---|
| 6,135,398 A | * | 10/2000 | Quesnel | G02B 6/4471 248/74.1 |
| 10,704,710 B2 | * | 7/2020 | Kim | F16L 3/1075 |
| 10,800,540 B2 | * | 10/2020 | Gilbertson | F16L 3/222 |
| 2015/0285407 A1 | * | 10/2015 | Aragon | H02G 3/34 248/70 |

OTHER PUBLICATIONS

Gilbertson et al., "Transport Element Clamp System," U.S. Appl. No. 15/668,370, filed Aug. 3, 2017, 45 pages.

* cited by examiner

*Primary Examiner* — Anita M King
(74) *Attorney, Agent, or Firm* — Yee & Associates, P.C.

(57) ABSTRACT

A transport element support system comprising a first portion, a second portion, and a channel formed by the first portion and the second portion. The first portion has a hinge pin and the second portion has a receiving element. The receiving element is configured to engage with the hinge pin to couple the first portion to the second portion. The channel is configured to receive a transport element when the first portion and the second portion are coupled to each other. The transport element support system electrically isolates the transport element from a support structure in an aircraft.

20 Claims, 10 Drawing Sheets

TRANSPORT ELEMENT SUPPORT SYSTEM

BACKGROUND INFORMATION

1. Field

The present disclosure relates generally to transport elements for aircraft applications. More specifically, the present disclosure relates to a transport element support system that maintains electrical isolation between a transport element and a single support structure and secures the transport element to the support structure.

2. Background

Various transport systems are used during operation of an aircraft. These transport systems may run throughout the aircraft and may be used to move fluid or electricity from one place to another. For example, transport elements may run between two support structures in the wing of the aircraft. When these transport elements contain fluid, the fluid may be fuel, hydraulic fluid, or gas.

During operation, the aircraft may be exposed to electromagnetic events. To protect systems from combustion and damage, Federal Aviation Administration regulations require aircraft manufacturers to ensure that no sparking occurs in flammable zones of the aircraft. To comply with these regulations, aircraft manufacturers must ground or isolate metal objects in the flammable zones. In many cases, assemblies having electrically isolating material are installed around transport elements to prevent sparking.

These assemblies are also used to support and restrain the transport elements as they flex under the conditions of aircraft operation. Hundreds of these assemblies are installed in an aircraft.

A single supportive assembly may contain multiple parts, including at least one metal bracket and metal fasteners. Each of these parts must adhere to predetermined electromagnetic effect requirements. For instance, when metal fasteners are used to secure a metal bridge, sparking and arcing at the joint may occur during an electromagnetic event. To protect against this occurrence, aircraft manufacturers install cap seals over each of the fasteners in the assembly. Positioning, alignment, processing, and sealing fasteners for each assembly takes innumerable hours of manpower.

Therefore, it would be desirable to have a method and apparatus that takes into account at least some of the issues discussed above, as well as other possible issues.

SUMMARY

An illustrative embodiment of the present disclosure provides a transport element support system comprising a first portion, a second portion, and a channel formed by the first portion and the second portion. The first portion has a hinge pin. The second portion has a receiving element configured to engage with the hinge pin to couple the first portion to the second portion. The channel is configured to receive a transport element when the first portion and the second portion are coupled to each other. The transport element support system electrically isolates the transport element from a support structure in an aircraft.

Another illustrative embodiment of the present disclosure provides a method for stabilizing a transport element in an aircraft. An insert is positioned around a periphery of the transport element. A receiving element on a second portion of a transport element support system is engaged with a hinge pin in a first portion of the transport element support structure to couple the first portion to the second portion. The insert with the transport element is positioned onto an engagement surface of the second portion. The first portion is rotated about the hinge pin and over the transport element to interface with the second portion such that the transport element sits within a channel formed by the first portion and the second portion.

A further illustrative embodiment of the present disclosure provides an aircraft comprising a support structure, a transport element running parallel to the support structure, and a transport element support system. The transport element support system comprises a first portion, a second portion, and a channel. The first portion has a hinge pin. The second portion has a receiving element configured to engage with the hinge pin. The channel is formed by the first portion and the second portion when the hinge pin is engaged with the receiving element. The channel is configured to receive the transport element when the first portion and the second portion are coupled to each other. The transport element support system electrically isolates the transport element from the support structure.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that the manufacturing process for electrically isolating and supporting transport elements in aircraft is often more expensive and time consuming than desired. Current solutions employ a metal intercostal attached to a stringer, bridging the gap between two support structures. The intercostal is secured with metal fasteners. An additional fitting is used to support and restrain a transport element within its surrounding structure. In other examples, a metal bracket is used to attach a support structure to a clamp holding the transport element in place. The clamp is fastened to the bracket.

Manually aligning and connecting multi-piece, complicated fittings takes significant assembly time. Moreover, each part of an assembly must adhere to specific electromagnetic effect requirements. The cap sealing process extends manufacturing time as each fastener must receive a cap seal on the top and on the bottom. As a result, it may take more time than desired to design, manufacture, and implement these parts.

The disclosed embodiments relate to a transport element support system that combines electromagnetic isolation and structural support without the need for the cap sealing process. The embodiments can be used in a wide variety of aircraft applications for stabilizing and protecting transport systems from electromagnetic effects.

Figure 1:
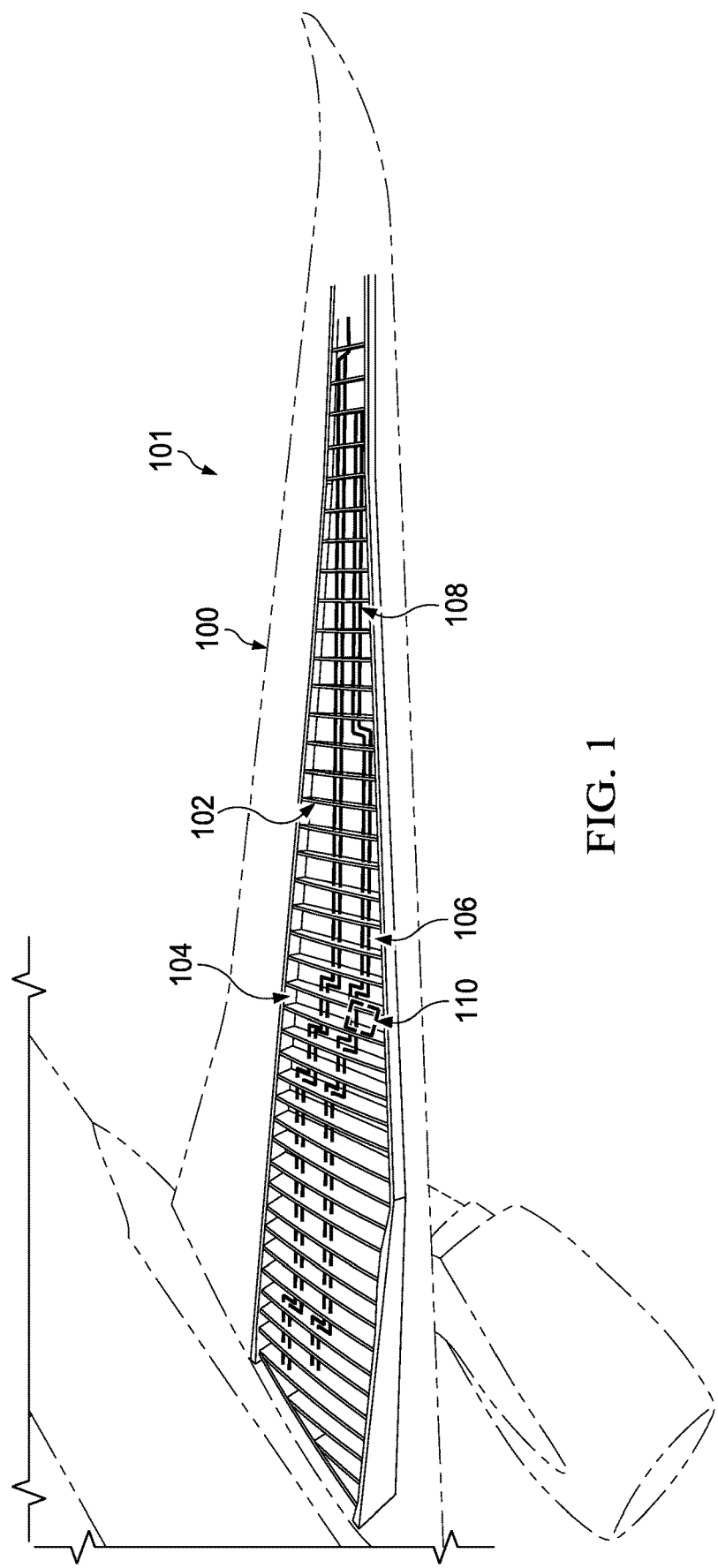
FIG. 1 is an illustration of a perspective view of a wing of an aircraft in accordance with an illustrative embodiment.

With reference now to the figures and, in particular, with reference to FIG. 1, an illustration of a perspective view of a wing of an aircraft is depicted in accordance with an illustrative embodiment. Wing 100 in aircraft 101 has ribs 102 and stringers 104. Transport system 106 runs through wing 100. Transport system 106 has transport elements 108. Transport elements 108 carry fluid through wing 100 in this illustrative example. In other illustrative examples, transport elements 108 may carry electricity or some other medium.

Transport elements 108 pass between stringers 104. In this illustrative example, transport elements 108 run parallel to stringers 104. At various locations along stringers 104, transport elements 108 may be secured to stringers 104 using transport element support systems (not shown in this view). Each transport element support system provides electrical isolation between transport elements 108 and stringers 104. The transport element support systems also provide structural support to hold transport elements 108 in place.

Section 110 of wing 100 shows a portion of transport system 106. Components in section 110 are shown in greater detail in FIG. 9.

Figure 2:
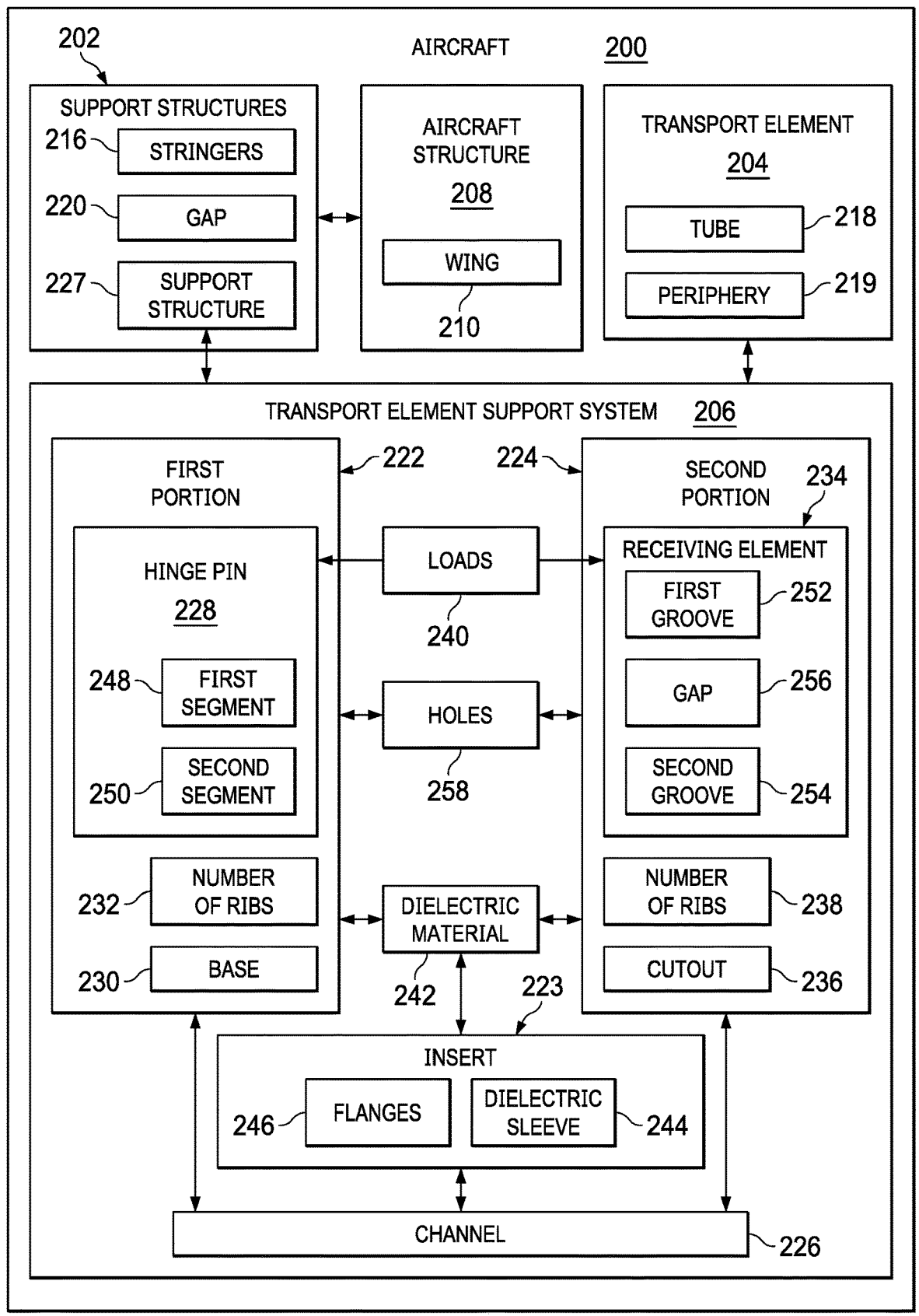
FIG. 2 is an illustration of a block diagram of an aircraft in accordance with an illustrative embodiment.

Turning now to FIG. 2, an illustration of a block diagram of an aircraft is depicted in accordance with an illustrative embodiment. Aircraft 200 comprises support structures 202, transport element 204, and transport element support system 206.

As depicted, support structures 202 may provide structural support for aircraft structure 208. Aircraft structure 208 may be any type of aerospace structure through which transport element 204 passes.

Aircraft structure 208 may take the form of wing 210 in this illustrative example. In other illustrative examples, aircraft structure 208 may be an engine nacelle, a muffler, a panel, a compartment, a housing, a tank, a cabin, a waste system, a portion of a fuselage, or any other type of aerospace structure where transport element support system 206 may be used.

Support structures 202 take the form of stringers 216 in this illustrative example. In other examples, support structures 202 may take the form of a rib, a spar, or some other type of support structure.

Transport element 204 is configured to move a medium from one place in aircraft 200 to another. That medium may take the form of, for example, without limitation, a fluid, fuel, hydraulic fluid, electricity, or some other medium.

When fluid flows through transport element 204, transport element 204 takes the form of tube 218. Tube 218 may have varying sizes depending on the medium being transported. Transport element 204 (tube 218) has periphery 219. The shape, size, diameter, wall thickness, and material for transport element 204 may be selected to comply with aircraft regulations or manufacturing specifications.

In this illustrative example, transport element 204 runs parallel to support structures 202 within gap 220 between support structures 202. Transport element support system 206 is used to stabilize transport element 204 between support structures 202. Transport element support system 206 electrically isolates transport element 204 from support structures 202 as well.

Electrical isolation is desirable to prevent sparking from electromagnetic effects. Electromagnetic effects may result from an electromagnetic event, such as a lightning strike or other electromagnetic event during operation of aircraft 200.

As depicted, transport element support system 206 comprises first portion 222, insert 223, second portion 224, and channel 226. Second portion 224 is configured to directly connect to a single support structure. In this illustrative example, second portion 224 directly connects to support structure 227. No brackets or other mechanisms are placed between second portion 224 and support structure 227.

First portion 222 has hinge pin 228, base 230, and number of ribs 232. Second portion 224 has receiving element 234, cutout 236, and number of ribs 238. As used herein, "a number of," when used with reference to items, means one or more items. Thus, a number of ribs includes one or more ribs.

In this illustrative example, hinge pin 228 and receiving element 234 are structures that form a locking mechanism for transport element support system 206. Specifically, receiving element 234 is configured to engage with hinge pin 228 to couple first portion 222 to second portion 224. Hinge pin 228 and receiving element 234 are configured to share loads 240 placed on transport element support system 206 during operation of aircraft 200. Hinge pin 228 and receiving element 234 may share loads 240 equally in some cases.

Number of ribs 232 in first portion 222 and number of ribs 238 in second portion 224 are structural elements. Open space is present between ribs. The shape, number, size, spacing, and configuration of ribs for each portion may vary depending on the particular implementation. Number of ribs 232 in first portion 222 and number of ribs 238 in second portion 224 are used to provide structural support without the need for solid structures, thus reducing the weight of transport element support system 206.

As depicted, base 230 of first portion 222 has a shape configured to fit within cutout 236 of second portion 224 when first portion 222 and second portion 224 are coupled to each other. In other words, the shape of base 230 of first portion 222 has substantially the same shape as cutout 236 of second portion 224. In this manner, first portion 222 and second portion 224 interface with one another as first portion 222 rotates about hinge pin 228 and over transport element 204.

As depicted, channel 226 is formed by first portion 222 and second portion 224. Channel 226 is configured to receive transport element 204 when first portion 222 and second portion 224 are coupled to each other.

Insert 223 is positioned within channel 226. Insert 223 is a flexible structure configured to surround periphery 219 of transport element 204. Insert 223 is configured to stabilize transport element 204 within channel 226.

In this illustrative example, first portion 222, second portion 224, and insert 223 are comprised of dielectric material 242. Dielectric material 242 may be comprised of a material selected from at least one of a thermoplastic material, a thermoset material, acetal homopolymer, nylon, polytetrafluoroethylene, polyamide-imide, graphite, carbon fiber reinforced plastic, melamine, phenolic and other resins (with or without reinforcing fibers), polyetheretherketone (PEEK), polyetherketoneketone (PEKK), rubber, or some other suitable electrically isolating material. In some cases, first portion 222, second portion 224, and insert 223 may be comprised of the same material. In other examples, one or more of these parts may be comprised of different types of materials than the others.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item C. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

In this illustrative example, insert 223 takes the form of dielectric sleeve 244. Dielectric sleeve 244 is configured to open to receive transport element 204. In some cases, transport element 204 may slip through a slit in dielectric sleeve 244. In other cases, dielectric sleeve 244 may open to allow transport element 204 to be placed inside. Dielectric sleeve 244 closes around transport element 204.

Dielectric sleeve 244 may have flanges 246 formed on each end. Each of flanges 246 prevents dielectric sleeve 244 from moving back and forth within channel 226.

In some illustrative examples, hinge pin 228 may be a single segment received by a single receiving element 234. In other illustrative examples, both hinge pin 228 and receiving element 234 may have multiple parts.

For instance, hinge pin 228 may comprise first segment 248 and second segment 250. First segment 248 and second segment 250 are separated by one of number of ribs 232 in first portion 222.

Receiving element 234 may comprise first groove 252 and second groove 254. Gap 256 exists between first groove 252 and second groove 254 in receiving element 234.

In this illustrative example, first groove 252 is configured to receive first segment 248 of hinge pin 228. In a similar fashion, second groove 254 is configured to receive second segment 250 of hinge pin 228. Gap 256 receives the rib separating first segment 248 and second segment 250.

As depicted, holes 258 are formed in transport element support system 206. Corresponding holes 258 are formed in first portion 222 as well as second portion 224. Holes 258 receive fasteners (not shown) used to secure transport element support system 206 to support structure 227.

With an illustrative embodiment, manufacturing and installation of transport element support system 206 may take less time than with currently used systems. Transport element support system 206 is both a clamp and a bracket that provides electromagnetic isolation and support for transport element 204 in one mechanism. Because all parts in transport element support system 206 are comprised of dielectric material 242, any fasteners used to secure transport element support system 206 to support structure 227 do not need to be cap sealed. As a result, the use of transport element support system 206 saves manufacturing time, decreases cost, and provides a lightweight assembly for ease of manufacturing. In addition, second portion 224 of transport element support system 206 directly connects to support structure 227, eliminating the need for metal brackets, intercostals, or other structures.

Figure 3:
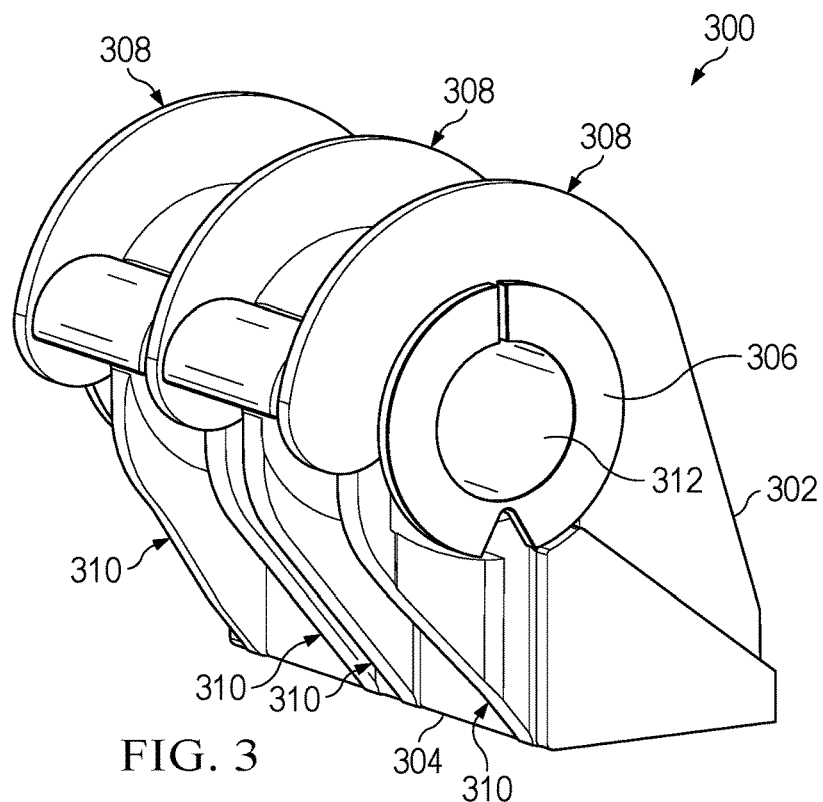
FIG. 3 is an illustration of a perspective view of a transport element support system in accordance with an illustrative embodiment.

With reference next to FIG. 3, an illustration of a perspective view of a transport element support system is depicted in accordance with an illustrative embodiment. FIG. 3 depicts an example of one implementation for transport element support system 206 shown in block form in FIG. 2.

As depicted, transport element support system 300 has first portion 302, second portion 304, and insert 306. FIG. 3 depicts transport element support system 300 in the locked position. In other words, second portion 304 and first portion 302 interface securely with one another.

In this illustrative example, first portion 302 has ribs 308. Second portion 304 has ribs 310. Although first portion 302 is shown with three ribs and second portion 304 is shown with four ribs, other numbers are possible. Empty space exists between ribs.

Channel 312 is also shown in this view. Insert 306 is shaped such that channel 312 is formed. A transport element (not shown in this view) may pass through channel 312. Although channel 312 is shown as having a circular shape, other shapes are possible, depending on how insert 306 is formed.

Although transport element support system 300 is shown as a three-piece assembly in this illustrative example, other configurations are possible. The assembly may have more or fewer pieces, depending on the implementation.

Figure 4:
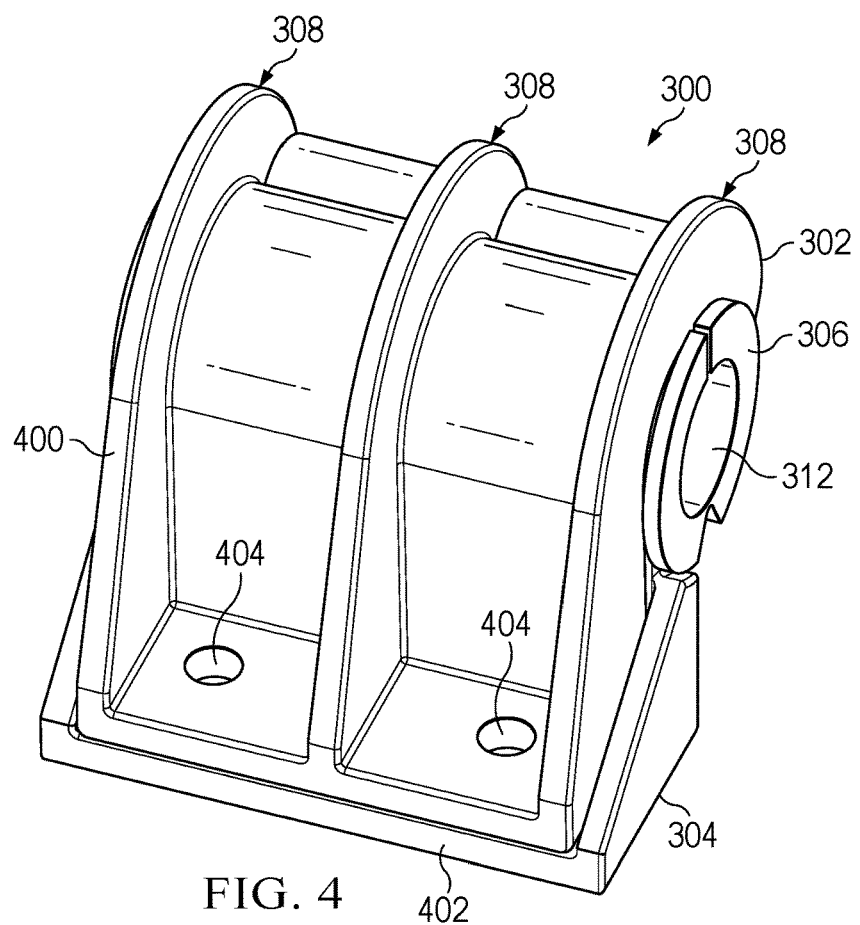
FIG. 4 another illustration of a perspective view of a transport element support system in accordance with an illustrative embodiment.

Turning now to FIG. 4, another illustration of a perspective view of a transport element support system is depicted in accordance with an illustrative embodiment. FIG. 4 shows transport element support system 300 from the opposite side. Ribs 308 in first portion 302 are shown in greater detail in this view.

As illustrated, first portion 302 has base 400. Second portion 304 has base 402. Base 400 and base 402 interface with one another. Holes 404 are formed through both base 400 and base 402 such that fasteners can secure first portion 302 and second portion 304 to a stringer (not shown in this view). Although two holes are shown in this illustrative example, other numbers of holes are possible.

Transport element support system 300 is designed to connect to a single support structure. Transport element support system 300 does not bridge a gap between support structures. Additionally, only three pieces are used in an illustrative embodiment to both clamp and electrically isolate the transport element from the support structure. No additional metal brackets are needed. Standard fasteners may be used without cap seals, since all pieces are made of dielectric material.

Figure 5:
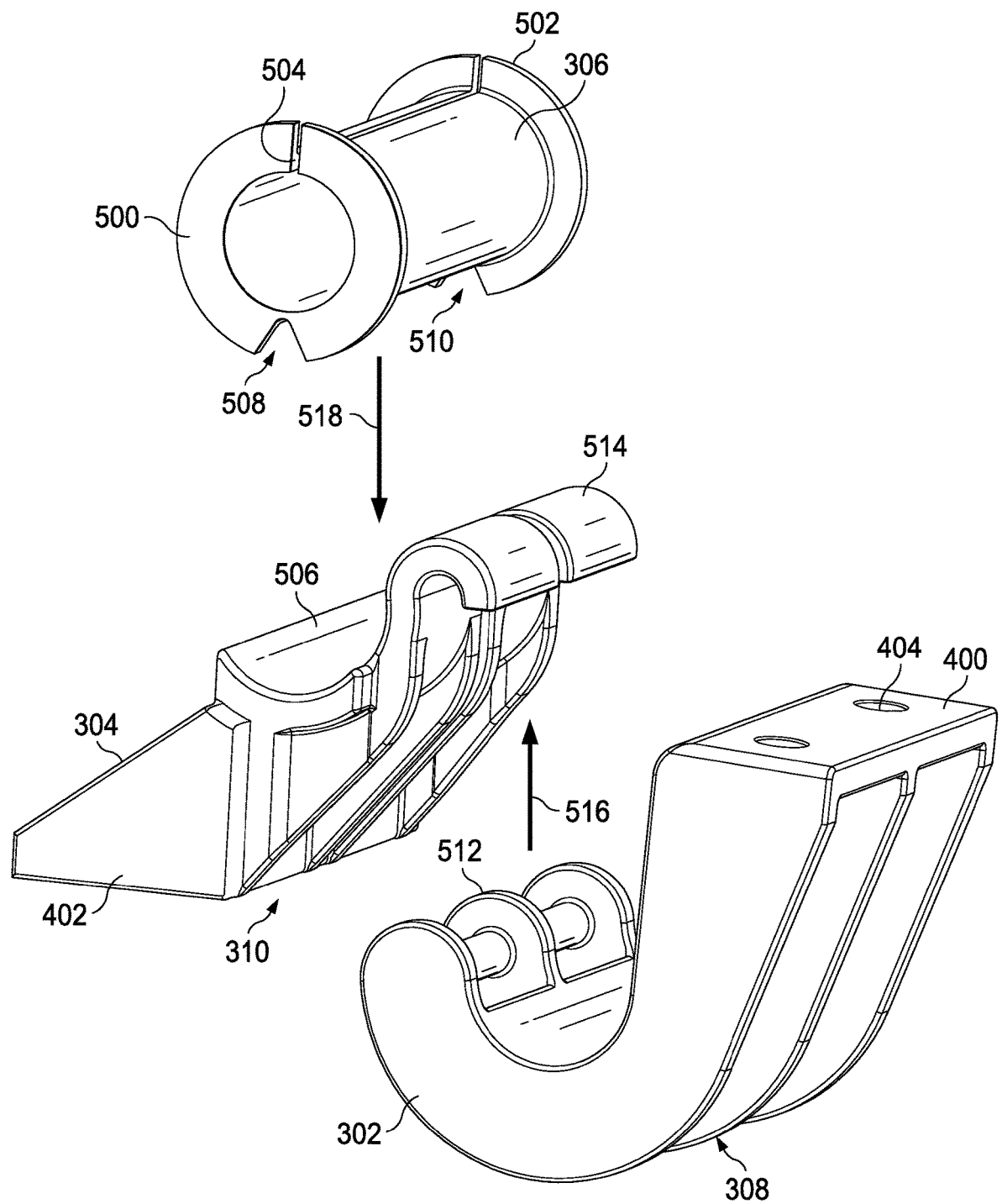
FIG. 5 is an illustration of an exploded view of a transport element support system in accordance with an illustrative embodiment.

With reference next to FIG. 5, an illustration of an exploded view of a transport element support system is depicted in accordance with an illustrative embodiment. As shown in this view, insert 306 has flange 500, flange 502, and slit 504. When transport element support system 300 is installed, flange 500 and flange 502 prevent insert 306 from sliding in an undesired manner back and forth along engagement surface 506 of second portion 304.

In this illustrative example, flange 500 has cutout 508 and flange 502 has cutout 510. Insert 306 opens along slit 504 such that insert 306 can be placed around a tube. Cutout 508 and cutout 510 allow for the opening of insert 306 along slit 504.

Inserts in various embodiments can be tailored to fit the needs of different types of transport elements. Inserts with similar thicknesses may be configured to hold the same or different types of transport elements, depending on the needs of the aircraft. In some cases, insert 306 may not be necessary.

Although insert 306 is shown in FIG. 5 as a flexible dielectric sleeve, other configurations are possible. For instance, insert 306 may comprise two or more pieces of dielectric material that snap closed around a tube. In still other illustrative examples, the sleeve may include two or more nested layers. The layer in contact with the transport element may be a dielectric sheet, tape, or sticker wrapped around the transport element and/or may include adhesive to glue the layer to the transport element.

As depicted, first portion 302 has hinge pin 512 and second portion 304 has receiving element 514. To secure first portion 302 to second portion 304, hinge pin 512 is moved in the direction of arrow 516 and engages with receiving element 514. Insert 306 moves in the direction of arrow 518 to rest on engagement surface 506 of second portion 304. Insert 306 may be positioned before or after first portion 302 is coupled to second portion 304.

Figure 6:
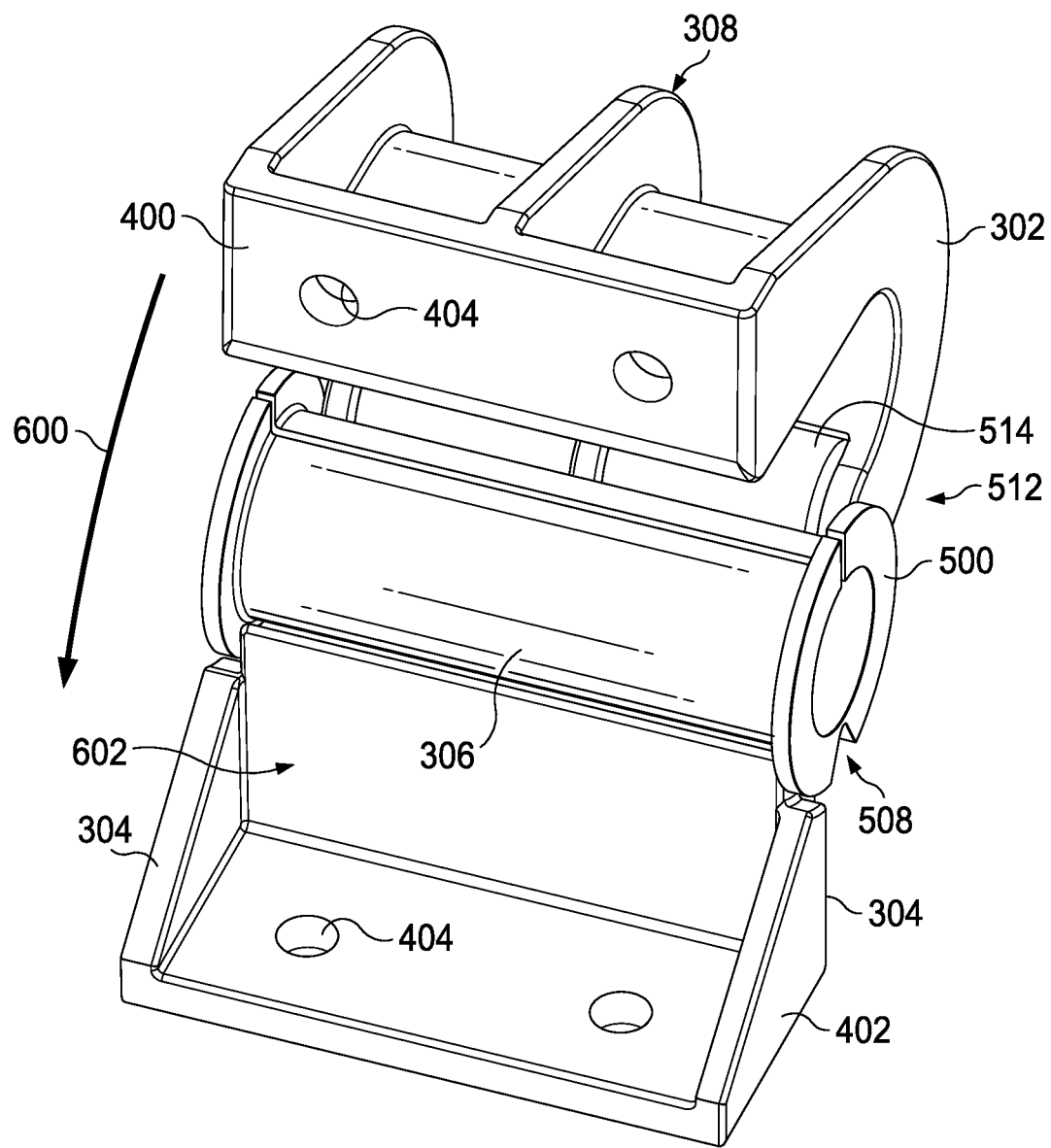
FIG. 6 is an illustration of a transport element support system in accordance with an illustrative embodiment.

Turning now to FIG. 6, an illustration of a transport element support system is depicted in accordance with an illustrative embodiment. FIG. 6 shows hinge pin 512 engaged with receiving element 514. First portion 302 is rotated about hinge pin 512 in the direction of arrow 600. When installed, base 400 of first portion 302 rests in cutout 602 of second portion 304 such that holes 404 line up.

Figure 7:
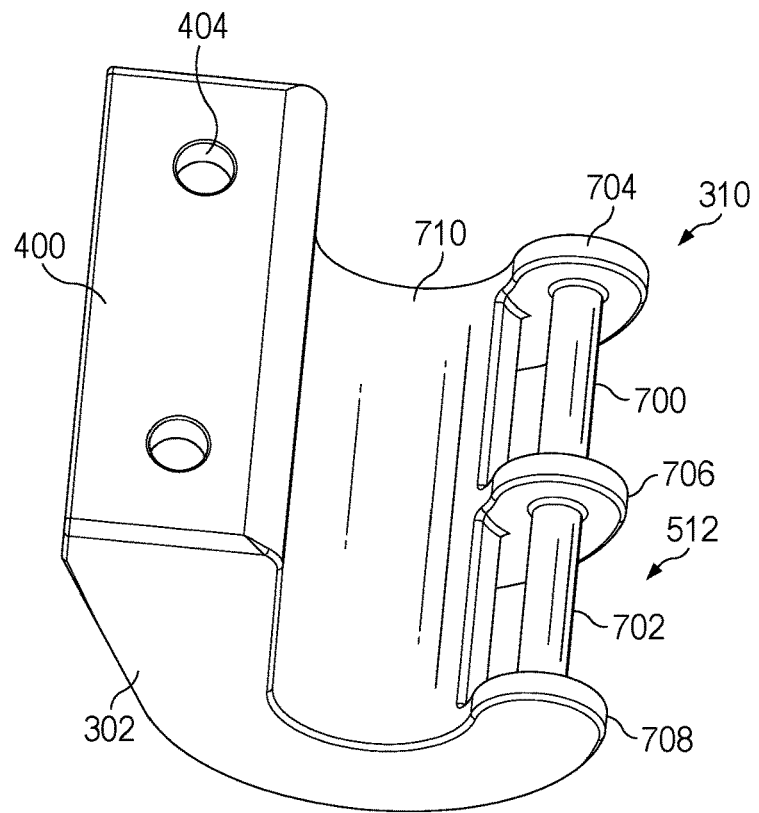
FIG. 7 is an illustration of a first portion of a transport element support system in accordance with an illustrative embodiment.

In FIG. 7, an illustration of a first portion of a transport element support system is depicted in accordance with an illustrative embodiment. FIG. 7 depicts a more-detailed view of the components of first portion 302 of transport element support system 300 shown in FIGS. 3-6.

As illustrated, hinge pin 512 includes first segment 700 and second segment 702. First segment 700 is positioned between rib 704 and rib 706 while second segment 702 is positioned between rib 706 and rib 708. First portion 302 has engagement surface 710 which has a shape and contour similar to that of engagement surface 506 in second portion 304 in this illustrative example.

Figure 8:
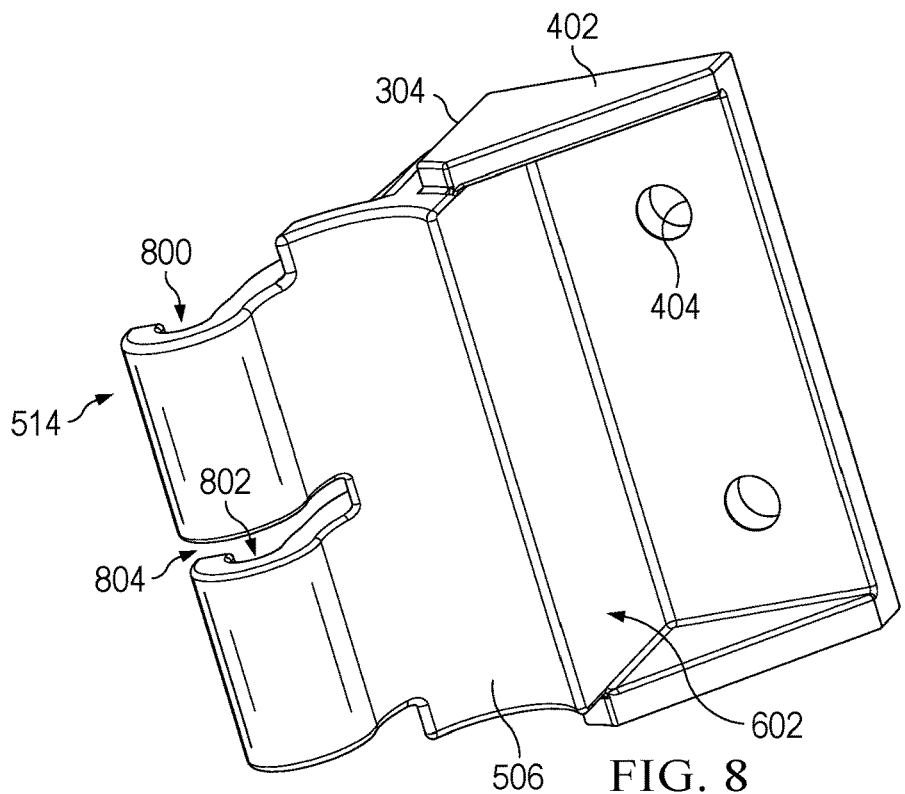
FIG. 8 is an illustration of a second portion of a transport element support system in accordance with an illustrative embodiment.

With reference next to FIG. 8, an illustration of a second portion of a transport element support system is depicted in accordance with an illustrative embodiment. FIG. 8 depicts a more-detailed view of the components of second portion 304 of transport element support system 300.

In this illustrative example, receiving element 514 includes first groove 800 and second groove 802 separated by gap 804. When first portion 302 is connected to second portion 304, first groove 800 of receiving element 514 engages first segment 700 of hinge pin 512. In a similar fashion, second groove 802 of receiving element 514 engages second segment 702 of hinge pin 512. Gap 804 accommodates rib 706.

Figure 9:
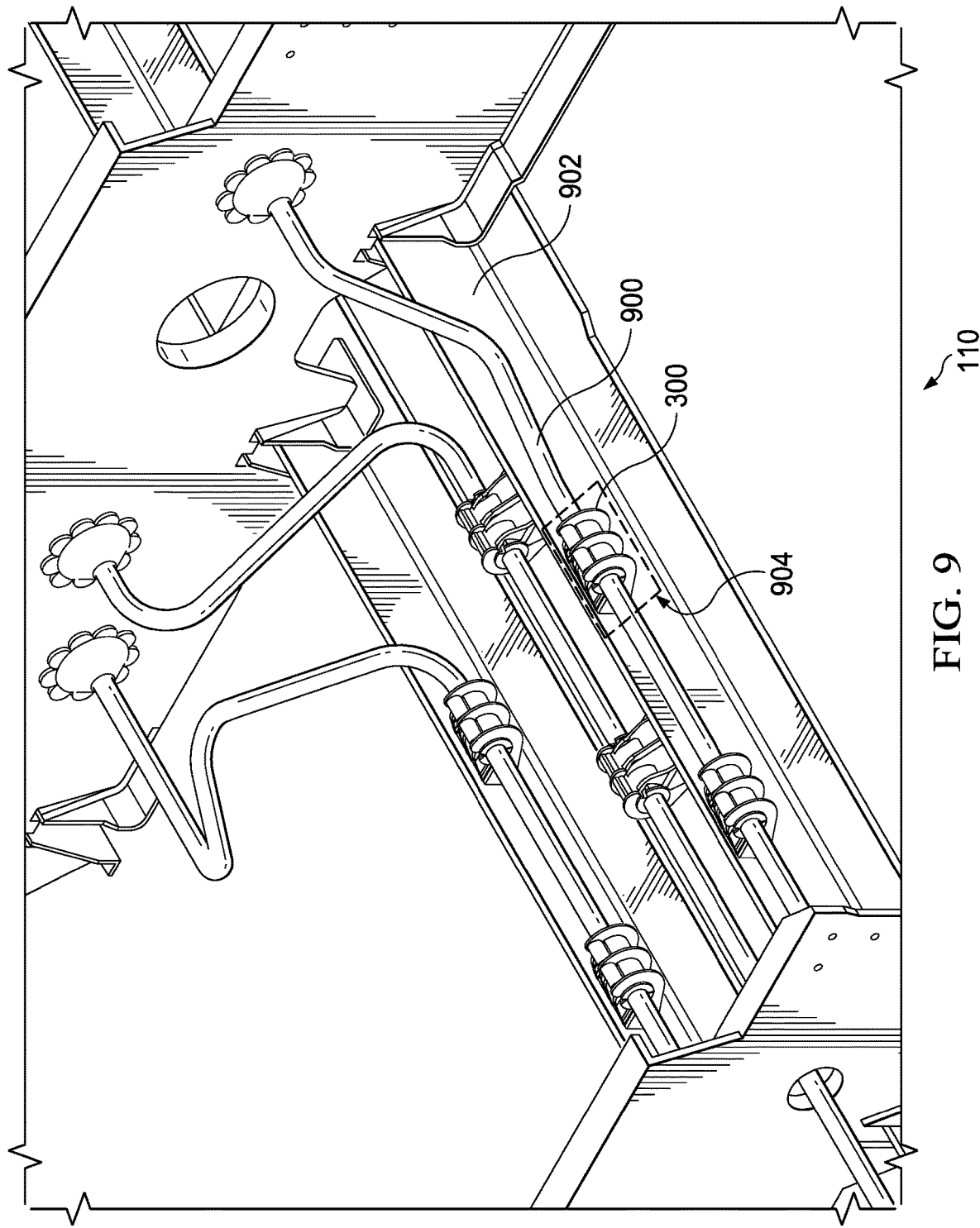
FIG. 9 is an illustration of a section of an aircraft showing components of a transport element support system in accordance with an illustrative embodiment.

Turning next to FIG. 9, an illustration of a section of an aircraft showing components of a transport element support system is depicted in accordance with an illustrative embodiment. FIG. 9 shows a more-detailed view of section 110 from FIG. 1 with the components in transport element support system 300 from FIG. 3 and FIG. 4 installed in wing 100 of aircraft 101.

As illustrated, transport element support system 300 connects transport element 900 to stringer 902. FIG. 9 shows a number of additional transport element support systems installed throughout the wing. The spacing between each assembly may be selected to support each transport element in a desired manner.

Figure 10:
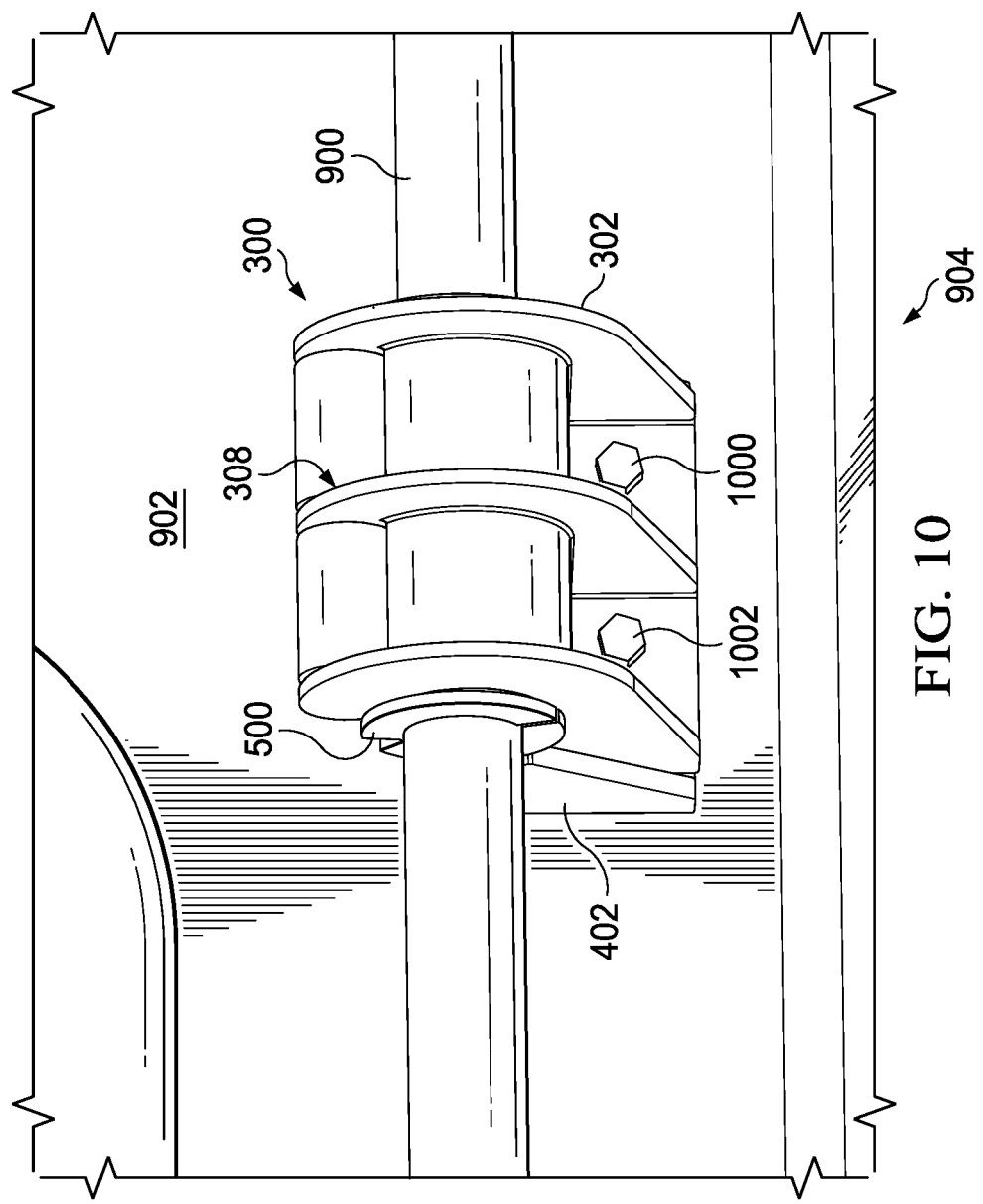
FIG. 10 is another illustration of a section of an aircraft showing components of a transport element support system in accordance with an illustrative embodiment.

With reference to FIG. 10, another illustration of a section of an aircraft showing components of a transport element support system in accordance with an illustrative embodiment. FIG. 10 is a more-detailed view of transport element support system 300 installed in wing 100 depicted in section 904.

In this illustrative example, transport element support system 300 is secured around transport element 900. Fastener 1000 and fastener 1002 have been installed to connect transport element support system 300 to stringer 902.

Wing 100 in FIG. 1 is only one physical implementation of a platform incorporating transport element support system 206 in FIG. 2. Although the examples for an illustrative embodiment are described with respect to an aircraft, an illustrative embodiment may be applied to other types of platforms. Transport element support system 206 in FIG. 2 may be used in any platform where tubing or wires are present. The platform may be, for example, a mobile platform, a stationary platform, a land-based structure, an aquatic-based structure, or a space-based structure. More specifically, the platform, may be a surface ship, a tank, a personnel carrier, a train, a spacecraft, a space station, a satellite, a submarine, an automobile, a power plant, a bridge, a dam, a house, a manufacturing facility, a building, and other suitable platforms.

The different components shown in FIG. 1 and FIGS. 3-10 may be combined with components in FIG. 2, used with components in FIG. 2, or a combination of the two. Additionally, some of the components in FIG. 1 and FIGS. 3-10 may be illustrative examples of how components shown in block form in FIG. 2 may be implemented as physical structures.

Other configurations of transport element support system 300 may be implemented other than those shown in FIGS. 3-10. For example, a transport element support system may be used to stabilize more than one tube and connect those tubes to a single stringer. In other illustrative examples, insert 306 may be absent. In such case, transport element 900 will sit directly in channel 312.

Figure 11:
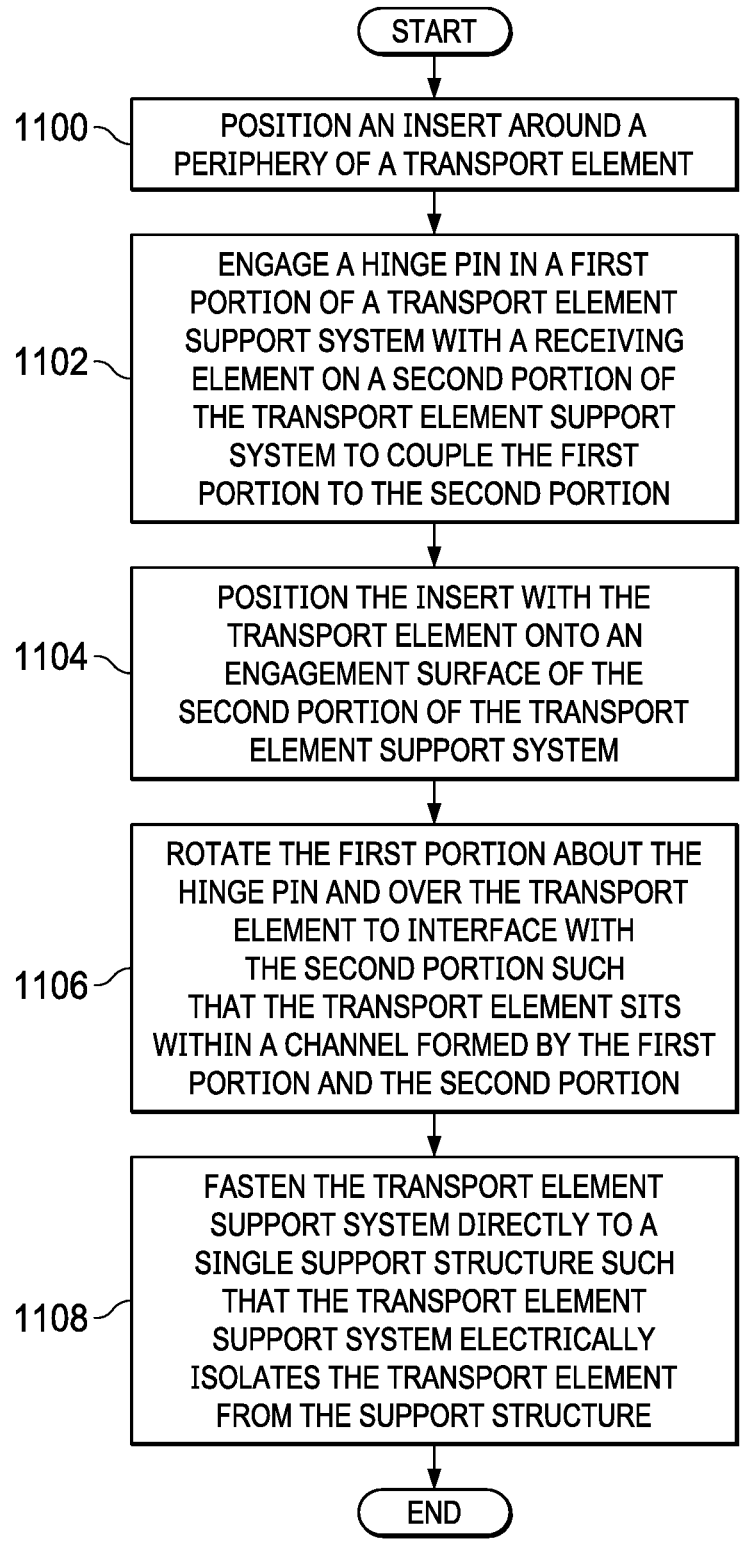
FIG. 11 is an illustration of a flowchart of a process for stabilizing a transport element in an aircraft in accordance with an illustrative embodiment.

With reference next to FIG. 11, an illustration of a flowchart of a process for stabilizing a transport element in an aircraft is depicted in accordance with an illustrative embodiment. The method depicted in FIG. 11 may be used to install transport element support system 206 shown in FIG. 2.

The process begins by positioning an insert around a periphery of a transport element (operation 1100). Next, the process engages a hinge pin in a first portion of a transport element support system with a receiving element on a second portion of the transport element support system to couple the first portion to the second portion (operation 1102).

The process then positions the insert with the transport element onto an engagement surface of the second portion of the transport element support system (operation 1104). The process rotates the first portion about the hinge pin and over the transport element to interface with the second portion such that the transport element sits within a channel formed by the first portion and the second portion (operation 1106).

Once the two pieces interface each other, the transport element support system is fastened directly to a single support structure such that the transport element support system electrically isolates the transport element from the support structure (operation 1108) with the process terminating thereafter. This process can be repeated to install each transport element support system in an aircraft.

A transport element support system in accordance with an illustrative embodiment may be installed in a different manner than described herein. For example, the transport element support system may be installed around already present transport elements during manufacturing of the aircraft or to replace existing support assemblies in the aircraft.

The flowcharts and block diagrams in the different depicted illustrative embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

Figure 12:
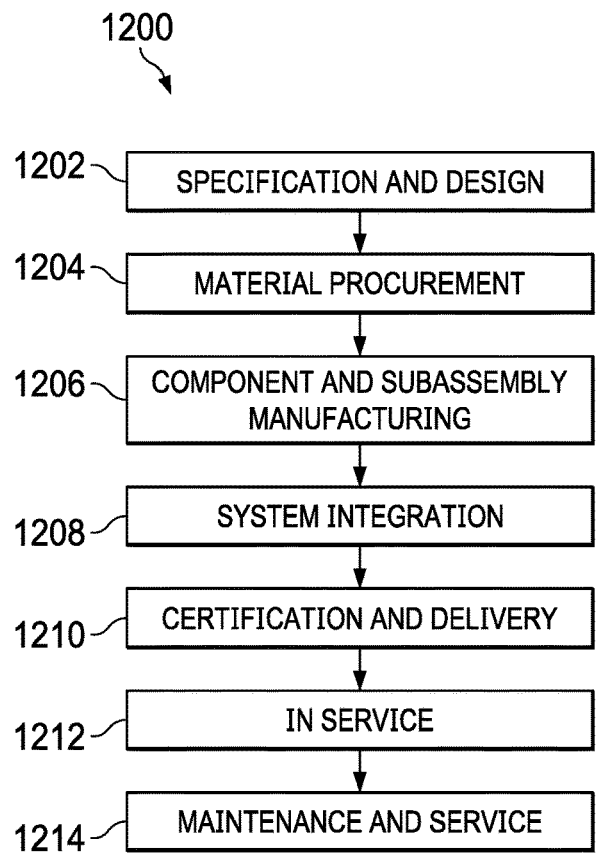
FIG. 12 is an illustration of a block diagram of an aircraft manufacturing and service method in accordance with an illustrative embodiment.
Figure 13:
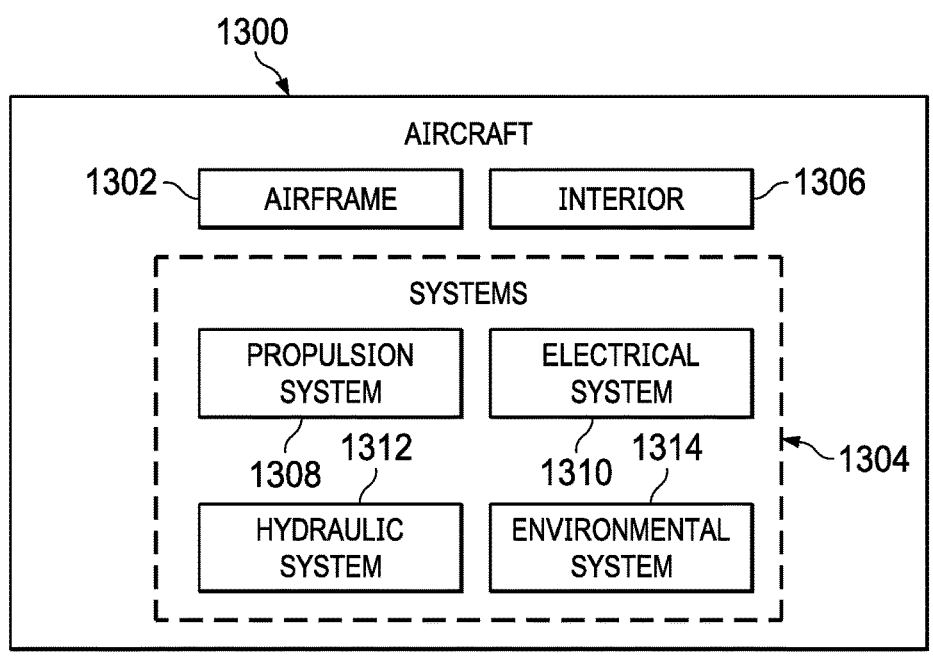
FIG. 13 is an illustration of a block diagram of an aircraft in which an illustrative embodiment may be implemented.

Illustrative embodiments of the disclosure may be described in the context of aircraft manufacturing and service method 1200 as shown in FIG. 12 and aircraft 1300 as shown in FIG. 13. Turning first to FIG. 12, an illustration of a block diagram of an aircraft manufacturing and service method is depicted in accordance with an illustrative embodiment. During pre-production, aircraft manufacturing and service method 1200 may include specification and design 1202 of aircraft 1300 in FIG. 13 and material procurement 1204.

During production, component and subassembly manufacturing 1206 and system integration 1208 of aircraft 1300 in FIG. 13 takes place. Thereafter, aircraft 1300 in FIG. 13 may go through certification and delivery 1210 to be placed in service 1212. While in service 1212 by a customer, aircraft 1300 in FIG. 13 is scheduled for routine maintenance and service 1214, which may include modification, reconfiguration, refurbishment, and other maintenance or service.

Transport element support system 206 from FIG. 2 and the components within transport element support system 206 may be made during component and subassembly manufacturing 1206. In addition, transport element support system 206 may be used in parts made for routine maintenance and service 1214 as part of a modification, reconfiguration, or refurbishment of aircraft 1300 in FIG. 13.

Each of the processes of aircraft manufacturing and service method 1200 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 13, an illustration of a block diagram of an aircraft is depicted in which an illustrative embodiment may be implemented. In this example, aircraft 1300 is produced by aircraft manufacturing and service method 1200 in FIG. 12 and may include airframe 1302 with plurality of systems 1304 and interior 1306. Examples of systems 1304 include one or more of propulsion system 1308, electrical system 1310, hydraulic system 1312, and environmental system 1314. Any number of other systems may be included. Although an aerospace example is shown, different illustrative embodiments may be applied to other industries, such as the automotive industry. Apparatuses and methods embodied herein may be employed during at least one of the stages of aircraft manufacturing and service method 1200 in FIG. 12.

In one illustrative example, components or subassemblies produced in component and subassembly manufacturing 1206 in FIG. 12 may be fabricated or manufactured in a manner similar to components or subassemblies produced while aircraft 1300 is in service 1212 in FIG. 12. As yet another example, one or more apparatus embodiments, method embodiments, or a combination thereof may be utilized during production stages, such as component and subassembly manufacturing 1206 and system integration 1208 in FIG. 12.

One or more apparatus embodiments, method embodiments, or a combination thereof may be utilized while aircraft 1300 is in service 1212, during maintenance and service 1214 in FIG. 12, or both. The use of a number of the different illustrative embodiments may substantially expedite the assembly of aircraft 1300, reduce the cost of aircraft 1300, or both expedite the assembly of aircraft 1300 and reduce the cost of aircraft 1300.

The illustrative embodiments decrease aircraft manufacturing and installation time. A transport element support system provides electromagnetic isolation and support for a transport element. Because all components within the transport element support system are made of a dielectric material, there is no risk of arching and sparking. As a result, the need for cap sealing fasteners can be reduced or eliminated, saving time and cost.

The hinge locking mechanism allows both portions to share loads applied to the transport element support system during operation of the aircraft, reducing the risk of failure.

The illustrative embodiments eliminate several of the components previously used to isolate and secure tubing. Further, the illustrative embodiments eliminate the need for each of the components to have separate electromagnetic effect protection. Electromagnetic isolation is achieved from the transport element support system 206 in FIG. 2 alone.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A transport element support system that comprises:
   a first portion that comprises:
      a base of the first portion; and
      a hinge pin that comprises segments separated by a rib;
   a second portion that comprises:
      a dielectric material;
      a receiving element that comprises a groove, respectively, for each segment of the segments of the hinge pin, configured to engage with the hinge pin and rotate into a coupled position that couples the first portion to the second portion; and
      a cutout configured to receive, in the coupled position, the base of the first portion; and
   a channel formed by the first portion and the second portion, wherein the channel is configured to receive a transport element with the first portion and the second portion in the coupled position.

2. The transport element support system of claim 1 further comprising:
   an insert positioned within the channel, wherein the insert is configured to surround a periphery of the transport element and stabilize the transport element within the channel.

3. The transport element support system of claim 2, wherein the first portion, and the insert each comprise a second dielectric material.

4. The transport element support system of claim 3, wherein the insert comprises:
   a dielectric sleeve configured to open to receive the transport element and close around the transport element.

5. The transport element support system of claim 3, wherein the second portion comprises:
   a cutout; and
   a number of ribs.

6. The transport element support system of claim 5, wherein the first portion comprises a number of ribs.

7. The transport element support system of claim 1, wherein the hinge pin and the receiving element are configured to share loads placed on the transport element support system during operation in an aircraft.

8. The transport element support system of claim 7, wherein the hinge pin comprises:
   a first segment; and
   a second segment, wherein the first segment and the second segment are separated by one of the number of ribs in the first portion of the transport element support system.

9. The transport element support system of claim 8, wherein the receiving element comprises:
   a first groove configured to receive the first segment of the hinge pin;
   a second groove configured to receive the second segment of the hinge pin; and
   a gap between the first groove and the second groove.

10. The transport element support system of claim 1, wherein the first portion is configured to rotate about the hinge pin and over an insert to interface with the second portion.

11. The transport element support system of claim 1, wherein the second portion is configured to directly connect to a single support structure in an aircraft.

12. A method for stabilizing a transport element in an aircraft, the method comprising:
   positioning an insert around a periphery of the transport element;
   forming a transport element support system via coupling a first portion comprising a base to a second portion comprising a cutout via:
      engaging a hinge pin, comprising segments separated by a rib, in the first portion with grooves in a receiving element on the second portion;
      positioning the insert around the transport element onto an engagement surface of the second portion; and
      rotating the first portion about the hinge pin and over the transport element to interface with the second portion such that:
         the transport element sits within a channel formed by the first portion and the second portion; and
         the base of the first portion sits within a cutout in the second portion.

13. The method of claim 12 further comprising:
   fastening the transport element support system directly to a single support structure such that the transport element support system electrically isolates the transport element from the single support structure.

14. The method of claim 12, wherein engaging the hinge pin with the receiving element comprises:
   engaging a first segment of the segments of the hinge pin with a first groove in the grooves in the receiving element; and
   engaging a second segment of the segments of the hinge pin with a second groove in the grooves in the receiving element.

15. The method of claim 12, wherein the insert comprises a dielectric sleeve and positioning the insert comprises:
   opening the dielectric sleeve to receive the transport element; and
   closing the dielectric sleeve around the periphery of the transport element.

16. An aircraft that comprises:
   a support structure;
   a transport element aligned parallel to the support structure; and
   a transport element support system that comprises:
      a first portion that comprises:
         a base of the first portion; and
         a hinge pin that comprises segments separated by a rib;
      a second portion that comprises:
         a dielectric material;
         a receiving element that comprises a groove, respectively, for each segment of the segments of the hinge pin, configured to engage with the hinge pin and rotate into a coupled position that couples the first portion to the second portion; and a cutout configured to receive, in the coupled position, the base of the first portion; and
   a channel formed by the first portion and the second portion in the coupled position, wherein the channel is configured to receive the transport element with the first portion and the second portion in the coupled position.

17. The aircraft of claim 16, wherein the transport element support system further comprises:
   an insert positioned within the channel, wherein the insert surrounds a periphery of the transport element to stabilize the transport element within the channel.

18. The aircraft of claim 17, wherein the first portion and the insert each comprise a second dielectric material.

19. The aircraft of claim 16, wherein the second portion is configured to directly connect to the support structure, and wherein the second portion comprises a second number of ribs.

20. The aircraft of claim 19, wherein the first portion comprises a first number of ribs.

\* \* \* \* \*